US012650206B2

(12) United States Patent
Kataoka

(10) Patent No.: US 12,650,206 B2
(45) Date of Patent: Jun. 9, 2026

(54) HYDROGEN FILLING DEVICE TO A DETACHABLE HYDROGEN TANK

(71) Applicant: TOYOTA JIDOSHA KABUSHIKI KAISHA, Toyota (JP)

(72) Inventor: Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/774,175

(22) Filed: Jul. 16, 2024

(65) Prior Publication Data

US 2025/0043916 A1 Feb. 6, 2025

(30) Foreign Application Priority Data

Aug. 1, 2023 (JP) ................................ 2023-125338

(51) Int. Cl.
*F17C 5/06* (2006.01)

(52) U.S. Cl.
CPC .......... *F17C 5/06* (2013.01); *F17C 2201/056* (2013.01); *F17C 2221/012* (2013.01); *F17C 2223/0123* (2013.01); *F17C 2225/0123* (2013.01)

(58) Field of Classification Search
CPC ................. F17C 5/06; F17C 2201/056; F17C 2221/012; F17C 2223/0123; F17C 2225/0123; F17C 2205/0173
USPC .......................................................... 141/346
See application file for complete search history.

(56) References Cited

U.S. PATENT DOCUMENTS

| | | | | |
|---|---|---|---|---|
| 2005/0115637 A1* | 6/2005 | Adams | F17C 5/06 141/351 |
| 2009/0166226 A1* | 7/2009 | Radford | F17C 13/04 251/149.6 |
| 2018/0038550 A1 | 2/2018 | Kondo | |
| 2018/0363820 A1* | 12/2018 | Lane | F16L 37/0841 |
| 2023/0408033 A1* | 12/2023 | Ehegartner | F17C 13/04 |

FOREIGN PATENT DOCUMENTS

| | | |
|---|---|---|
| JP | 2018-021651 A | 2/2018 |
| WO | 2022/069078 A1 | 4/2022 |

* cited by examiner

*Primary Examiner* — Christopher M Afful
(74) *Attorney, Agent, or Firm* — Dinsmore & Shohl LLP

(57) ABSTRACT

To provide a hydrogen filling device for a detachable hydrogen tank (hydrogen cartridge) capable of preventing unintentional release of hydrogen. A device for filling hydrogen into a desirable hydrogen cartridge is provided. A connecting part connected with the hydrogen cartridge to fill the hydrogen cartridge with hydrogen. A locking mechanism for regulating detachment of the hydrogen cartridge from the device. The locking mechanism is connected to the hydrogen cartridge using a pressure of hydrogen to lock the hydrogen cartridge when the hydrogen is filled in the hydrogen cartridge.

6 Claims, 6 Drawing Sheets

HYDROGEN FILLING DEVICE TO A DETACHABLE HYDROGEN TANK

CROSS-REFERENCE TO RELATED APPLICATIONS

This application is based upon and claims the benefit of priority of the prior Japanese Patent Application No. 2023-125338, filed on Aug. 1, 2023, the entire contents of which are incorporated herein by reference.

FIELD

The present disclosure relates to an apparatus for charging hydrogen into a desirable hydrogen tank to an apparatus utilizing hydrogen.

BACKGROUND

Patent Document 1 describes a system in which hydrogen is filled in a hydrogen tank in a vehicle.

Citation List

Patent Literature

Patent Literature 1: JP 2018-021651 A

SUMMARY

Technical Problem

It is considered that a hydrogen tank for supplying hydrogen for power generation to a device equipped with a fuel cell (hydrogen consumption device) is used, and a device for filling hydrogen into a hydrogen cartridge (hereinafter, sometimes referred to as a "hydrogen filling device") is used when hydrogen is filled in a hydrogen tank (a portable hydrogen cartridge, hereinafter, sometimes simply referred to as a "hydrogen cartridge") which is detachable from the hydrogen consumption device. In other words, a hydrogen cartridge in which hydrogen is consumed by a hydrogen consuming device is mounted on a hydrogen filling device to fill a hydrogen cartridge with hydrogen, and a hydrogen cartridge filled with hydrogen is desorbed from the hydrogen filling device and is again mounted on the hydrogen consuming device.

In the filling of hydrogen into the hydrogen cartridge by such a hydrogen filling device, it is desired to prevent the hydrogen cartridge from being detached from the hydrogen filling device during the filling of the hydrogen, or erroneously detaching the hydrogen cartridge, thereby releasing the hydrogen.

Accordingly, it is an object of the present disclosure to provide a hydrogen filling apparatus for a detachable hydrogen tank (hydrogen cartridge) capable of preventing the release of hydrogen which is not intended in the present disclosure.

Solution to Problem

The present application discloses a hydrogen filling device which is an apparatus for filling hydrogen into a detachable hydrogen cartridge, and includes a connecting portion which is connected to the hydrogen cartridge and fills the hydrogen cartridge with hydrogen, and a locking mechanism which restricts detachment of the hydrogen cartridge from the apparatus, wherein the locking mechanism is connected to the hydrogen cartridge using a pressure of hydrogen when the hydrogen is filled into the hydrogen cartridge to lock the hydrogen cartridge.

Locking mechanism has a cylinder and a pin, the cylinder flows hydrogen branched from the pipe through which hydrogen flows, the pin by the pressure of the hydrogen flowing is moved is pressed, the pressed pin is engaged with the hydrogen cartridge it may be configured to be locked state.

Effects

According to the hydrogen filling device of the present disclosure, when hydrogen is filled in the hydrogen cartridge, the hydrogen filling apparatus and the hydrogen cartridge are made non-detachable by the locking mechanism, and during the hydrogen filling, the non-detachable condition is maintained, and since the hydrogen cartridge is not detached from the hydrogen filling apparatus during the hydrogen filling, unintentional release of hydrogen can be prevented.

DESCRIPTION OF EMBODIMENTS

1. Hydrogen Tank

First, a hydrogen cartridge in which hydrogen is filled by the hydrogen filling apparatus of the present disclosure will be described with reference to a form example.

Figure 1A:
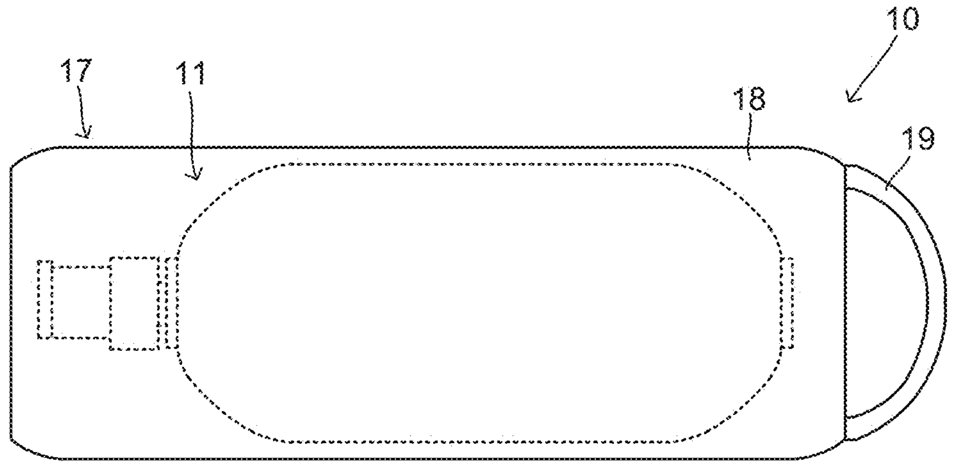
FIG. 1A is a diagram illustrating an external view of a hydrogen cartridge 10.
Figure 1B:
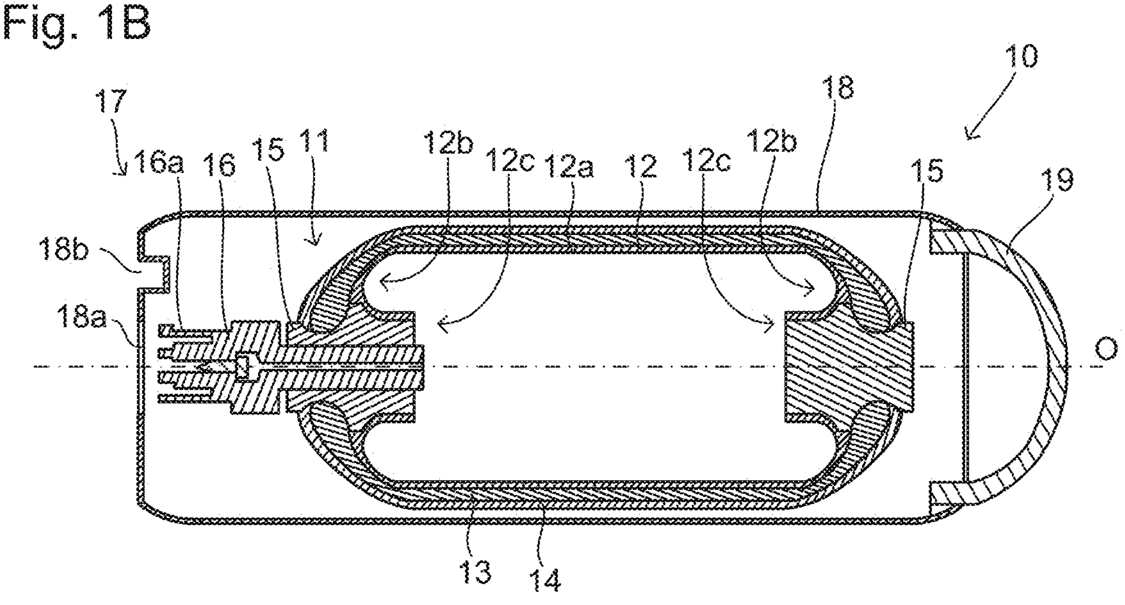
FIG. 1B is a diagram illustrating a cross-sectional view of the hydrogen cartridge 10.

The hydrogen cartridge 10 is a container in which a gas to be supplied (hydrogen in this form) is stored in a liquid state or a gaseous state. FIGS. 1A and 1B show diagrams for illustration. FIG. 1A is an external view of the hydrogen cartridge 10 (the tank 11 to be contained is represented by a dotted line.). FIG. 1B is a cross-sectional view along the direction of the axis O of the hydrogen cartridge 10. As can be seen from these FIGS., the hydrogen cartridge 10 in this form has a tank 11 and a case 17.

Further, the tank 11 includes a liner 12 constituting a container body, a reinforcing layer 13, and a protective layer 14, and a mouthpiece 15 and an opening/closing valve 16 are disposed in the container body.

1.1. Liner

The liner 12 is one of the members constituting the container body of the tank 11, and is a hollow member defining an internal space, and is cylindrical in this form. Liner 12, the opening at both ends of the fuselage portion 12*a* whose diameter is substantially constant is narrowed by the dome-shaped side-end 12*b*, the mouthpiece 15 is disposed in the narrowed opening 12*c*.

It is sufficient that the liner 12 is made of a material capable of retaining (e.g., hydrogen) contained in its internal space without leaking, and a known material can be used as the material. Specifically, for example, a nylon resin, a polyethylene-based synthetic resin, or made of a metal such as stainless steel or aluminum. Among them, in some embodiments, the material constituting the liner is a synthetic resin from the viewpoint of weight reduction of the tank.

The thickness of the liner 12 is not particularly limited, and, in some embodiments, is 0.5 mm-3.0 mm

1.2. Reinforcement Layer

The reinforcing layer 13 is one of members constituting the container body, and a fiber is laminated over a plurality of layers, and a cured resin is impregnated into the fiber. A layer made of fibers is formed by winding a fiber bundle over a plurality of layers to a predetermined thickness on an outer periphery of a liner 12. Although the thickness of the reinforcing layer 13 and the number of turns of the fiber bundle are determined by the required strength, they are not particularly limited, but are of a 10 mm-30 mm degree.

<Fiber Bundle>

For example, carbon fibers are used for the fiber bundle of the reinforcing layer 13, and the fiber bundle has a band shape in which carbon fibers form a bundle and have a predetermined cross-sectional shape (e.g., a rectangular cross section). Although not particularly limited, there may be mentioned a rectangular shape having a 6 mm-20 mm cross section and a 0.1 mm-0.3 mm thickness. The amount of carbon fibers contained in the fiber bundle is not particularly limited, and examples thereof include a carbon fiber of about 36000.

<Impregnated Resin>

The resin impregnated and cured in the fiber (fiber bundle) in the reinforcing layer 13 is not particularly limited as long as it can increase the strength of the fiber by this. Examples thereof include a thermosetting resin which is cured by heat, and specific examples thereof include an amine-based or anhydride-based curing accelerator and an epoxy resin containing a rubber-based reinforcing agent, an unsaturated polyester resin, and the like. In addition, a resin composition containing an epoxy resin as a main agent and cured by mixing a curing agent thereto can be also mentioned. According to this, it is automatically cured by allowing the resin composition which is the mixture to reach and penetrate the fiber layer between the time when the main agent and the curing agent are mixed and cured.

1.3. Protective Layer

If necessary, a protective layer 14 may be disposed on the outer periphery of the reinforcing layer 13 as one of the members constituting the container body. When provided, for example, glass fibers are wound and impregnated with a resin. The resin to be impregnated can be considered similarly to the reinforcing layer 13. Thus it is possible to impart impact resistance to the tank 11.

The thickness of the protective layer 14 is not particularly limited, but may be about 1.0 mm-1.5 mm.

1.4. Mouthpiece

Mouthpiece 15 is a member which is attached to each of the two opening 12*c* of the liner 12 is disposed at each of the axial line O of the liner 12, the mouthpiece 15 on one end side of the container body opening and closing valve 16 is disposed with functions as an opening for communicating the inside and outside. The other end side mouthpiece 15 is closed.

The member constituting the base 15 is not particularly limited as long as it has the necessary strength, and examples thereof include stainless steel and aluminum.

1.5. Open/Close Valve

The on-off valve 16 is closed when the hydrogen cartridge 10 is not mounted in the hydrogen charging device 50, is opened by being pressed by the push rod 55*a* when the hydrogen cartridge 10 is mounted in the hydrogen charging device 50 as will be described later.

The distal end of the on-off valve 16, on the side connected to the hydrogen filling device 50, and has a connecting portion 16*a* connected to the hydrogen filling apparatus 50. The connecting portion 16*a* is a portion capable of engaging and disengaging the connecting portion 16*a* and the connected portion 55*b* of the hydrogen-filling device 50. The specific aspect is not limited, but a mechanical coupling (mechanical interface) can be exemplified in the present embodiment, among which a mount such as connecting a photographing lens to the main body in the camera can be applied, and more specifically, it is possible to use the C mount. Therefore, in this form, the connecting portion 16*a* is connected to the connected portion 55*b* of the hydrogen charging device 50 while rotating the hydrogen cartridge 10 about the axial line O.

1.6. Case

The case 17 is a member that encloses the tank 11 and forms an outer shell of the hydrogen cartridge 10, and has a housing 18 and a handle 19.

Housing 18 is a cylindrical member, and is configured to be able to store the tank 11 inside. In the housing 18 is a hole 18*a* is provided at a position where the opening and closing valve 16 of the accommodated tank 11 is opposed, it is configured to be able to access the opening and closing valve 16 from the outside.

Further, in the present embodiment, it has a locking mechanism-engaging portion 18*b* which is a recess when viewed from the outside on the surface of the housing 18 is provided a bore 18*a*. Locking member 57 of the hydrogen-filling device 50 is engaged with the locking mechanism-engaging portion 18*b* as described later.

The handle 19 is an arcuate member disposed at an end of the housing 18 opposite to the side on which the opening/closing valve 16 of the tank 11 is disposed. The user can carry the hydrogen cartridge 10 with the handle 19 or perform the operation of attaching/detaching the hydrogen cartridge 10 to/from the hydrogen filling device 50.

1.7. Other

The allowable pressure of the tank 11 is not particularly limited, but a tank in which hydrogen can be stored at an allowable pressure of 70 MPa or less beyond 20 MPa from the viewpoint of being relatively easy to carry and capable of storing more hydrogen can be exemplified. By the application of the hydrogen filling apparatus of the present disclosure to a tank in which such an inside becomes a high pressure, prevention of unintentional hydrogen release becomes more important.

2. Structure of the Hydrogen Filling Device

Figure 2:
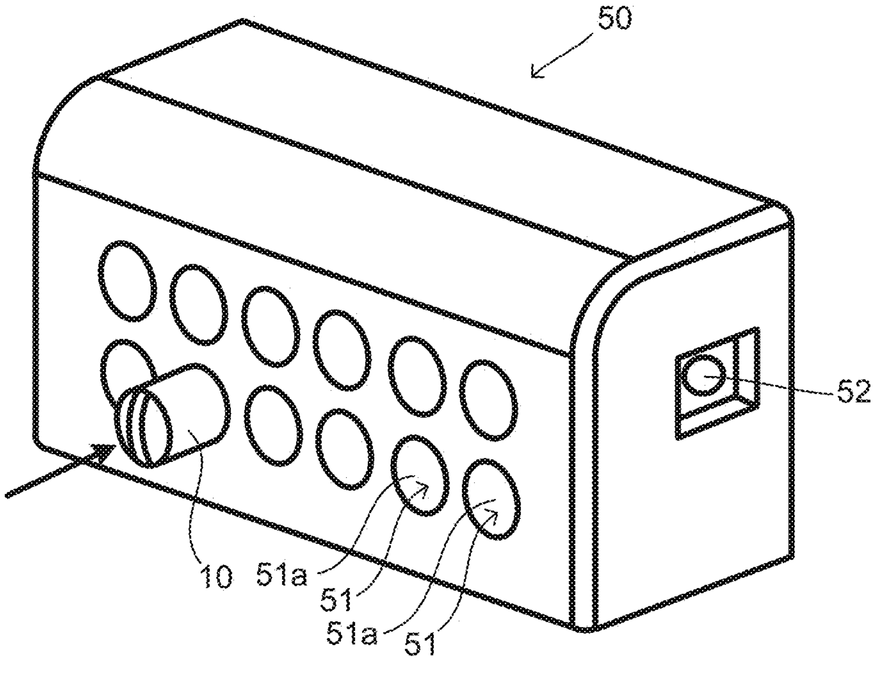
FIG. 2 is an appearance of the hydrogen filling device 50.
Figure 3:
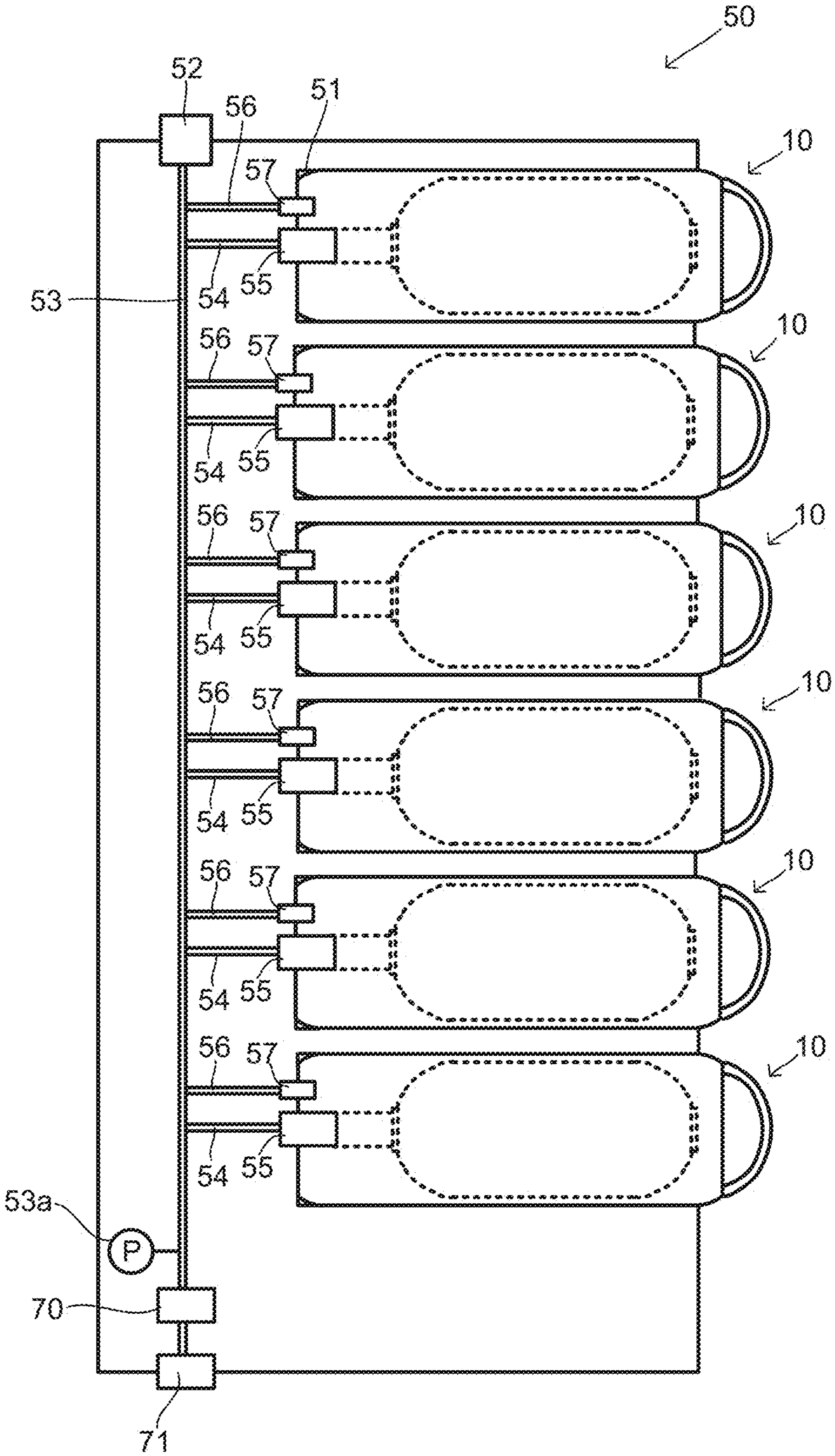
FIG. 3 is a diagram illustrating an internal configuration of the hydrogen filling apparatus 50.

The configuration of the hydrogen filling apparatus 50 according to one form will be described below. FIG. 2 is a perspective view of the hydrogen filling device 50, FIG. 3 is a diagram schematically showing the internal configuration of the hydrogen filling device 50 (upper stage of the storage portion 51 of the upper and lower two stages in FIG. 2). The hydrogen filling device 50 is a device for filling hydrogen into the hydrogen cartridge 10 In other words, it is configured such that the hydrogen cartridge 10 in which hydrogen is consumed is mounted and can be detached after the hydrogen cartridge 10 is filled with hydrogen.

Therefore, the hydrogen filling apparatus 50 includes a housing portion 51, the hydrogen supply unit 52, the main pipe 53, the hydrogen supply branch pipe 54, the connecting device 55, the locking mechanism branch pipe 56, the locking mechanism 57, the valve 70, and a hydrogen discharge unit 71.

It will be described in more detail below for.

2.1. Storage

Figure 4:
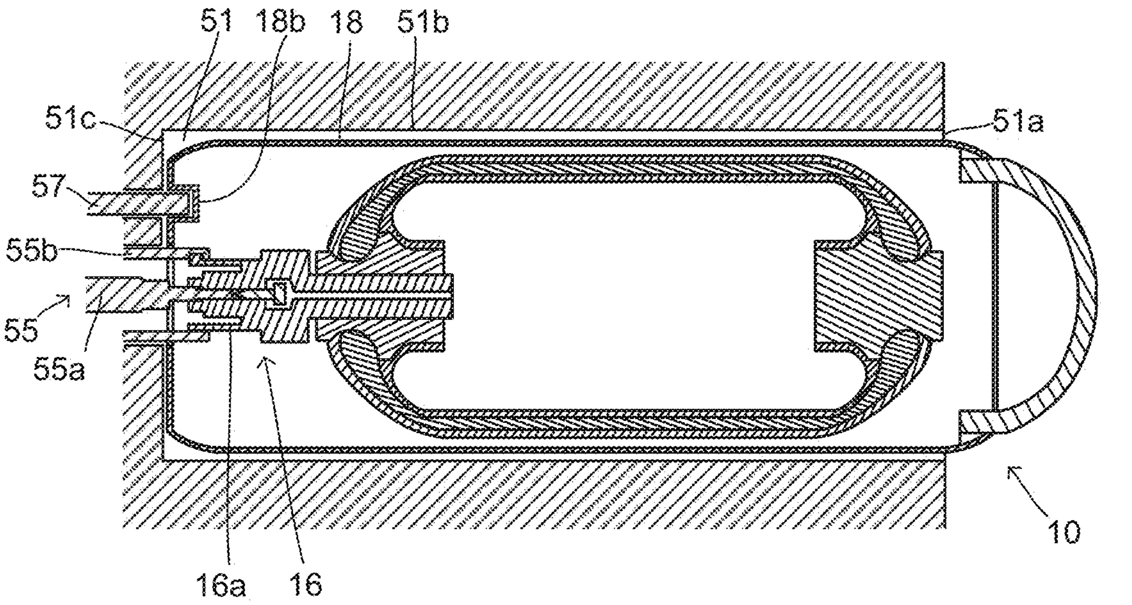
FIG. 4 is a sectional view showing a situation in which the hydrogen cartridge 10 is mounted, with attention paid to one storage portion 51.

The storage portion 51 is a portion where the hydrogen cartridge 10 is stored when the hydrogen cartridge 10 is connected to the hydrogen filling device 50. FIG. 2 schematically shows a situation in which the hydrogen cartridge 10 is to be stored in one storage portion 51. FIG. 3 shows a situation in which hydrogen cartridges 10 are mounted on all of the plurality of arranged storage portions 51. In FIG. 4, attention is paid to one housing portion 51, showing a scene in which the hydrogen cartridge 10 is housed in a cross-sectional view (reference numeral of each portion of the hydrogen cartridge 10 shown in FIG. 4 in FIG. 1B).

As can be seen from these FIGS., the storage portion 51 is a space in which the hydrogen cartridge 10 is disposed, and is a space surrounded by an inner wall 51*b* having an opening 51*a* through which the hydrogen cartridge 10 can be taken in and out. Connecting device 55 to the bottom 51*c* opposite to the opening 51*a* of the housing portion 51, the locking mechanism 57 is disposed.

In this form, the storage portion 51 is provided with 6 storage portions 51 at each stage in the upper and lower 2 stages, but the number of the storage portions 51 is not particularly limited.

2.2. Hydrogen Supply Section

The hydrogen supply unit 52 is a supply port for supplying hydrogen to be filled in the hydrogen cartridge 10 to the hydrogen filling device 50. Thus the hydrogen supply unit 51 connecting member of the hydrogen supply pipe extending from the hydrogen supply device such as a hydrogen station (sometimes referred to as a nozzle.) is connected. As a typical form of the hydrogen supply unit 51, a receptacle may be mentioned.

2.3. Main Piping

The main pipe 53 is a pipe through which hydrogen connecting from the hydrogen supply unit 52 to the hydrogen discharge unit 71, the branch pipe 56 for the hydrogen supply branch pipe 54 and the locking mechanism from the main pipe 53 branches.

The main pipe 53 is provided with a pressure gauge 53*a*, and is configured to be able to know the internal pressure.

2.4. Hydrogen Supply Branch Pipe and Connecting Device

Hydrogen supply branch pipe 54 branches from the main pipe 53, a pipe extending toward each housing portion 51. Hydrogen supply branch pipe 54 is a pipe through which hydrogen to be filled in the hydrogen cartridge 10, and supplies hydrogen to the connecting device 55. Incidentally, the check valve is disposed in the hydrogen supply branch pipe 54, although the flow of hydrogen from the main pipe 53 to the hydrogen cartridge 10 is allowed, the flow of hydrogen from the hydrogen cartridge 10 to the main pipe 53 is the reverse is regulated.

Connecting device 55, at the bottom 51*c* of the housing portion 51, is disposed at a connecting portion between the tank 11 of the hydrogen cartridge 10 of the hydrogen supply branch pipe 54, connected to the opening and closing valve 16 of the tank 11 described above, the opening and closing of the opening and closing valve 16 of the tank 11 operated to flow hydrogen into the tank 11.

Connecting device 55 in this form, as can be seen from FIG. 4, has a rod-shaped push rod 55*a* disposed in the housing portion 51, the push rod 55*a* when the hydrogen cartridge 50 is housed in the housing portion 51 pushes the valve member of the on-off valve 16 it is possible to flow hydrogen from the hydrogen supply branch pipe 54 into the tank 11 while opening the on-off valve 16.

Further, the connecting device 55 in this form has a connected portion 55*b* to be engaged with the connecting portion 16*a* provided at the distal end of the on-off valve 16. The form of the portion to be connected 55 is adapted to the form of the connecting portion 16*a*.

2.5. Bifurcated Pipe and Locking Mechanism for Locking Mechanism

Branch pipe 56 for the locking mechanism branches from the main pipe 53, a pipe extending toward the respective storage portion 51. Locking mechanism branch pipe 56 is a pipe through which hydrogen was pressurized for operating the lock mechanism 57, and supplies hydrogen to the lock mechanism 57.

Figure 5A:
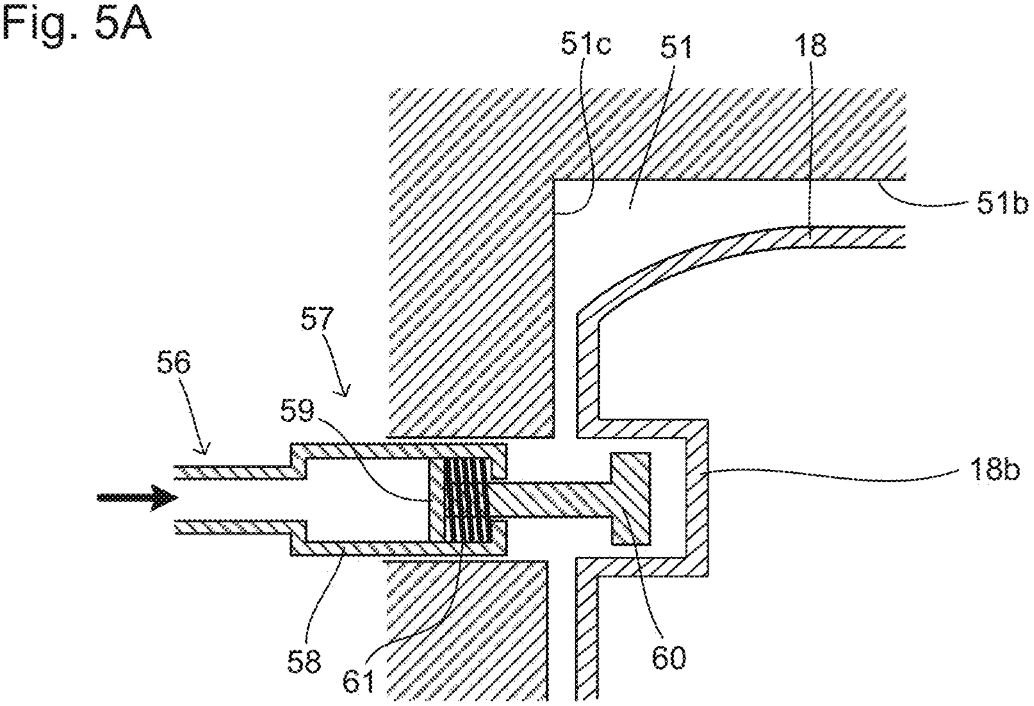
FIG. 5A is a diagram illustrating a locking mechanism 57 in a locked state.
Figure 5B:
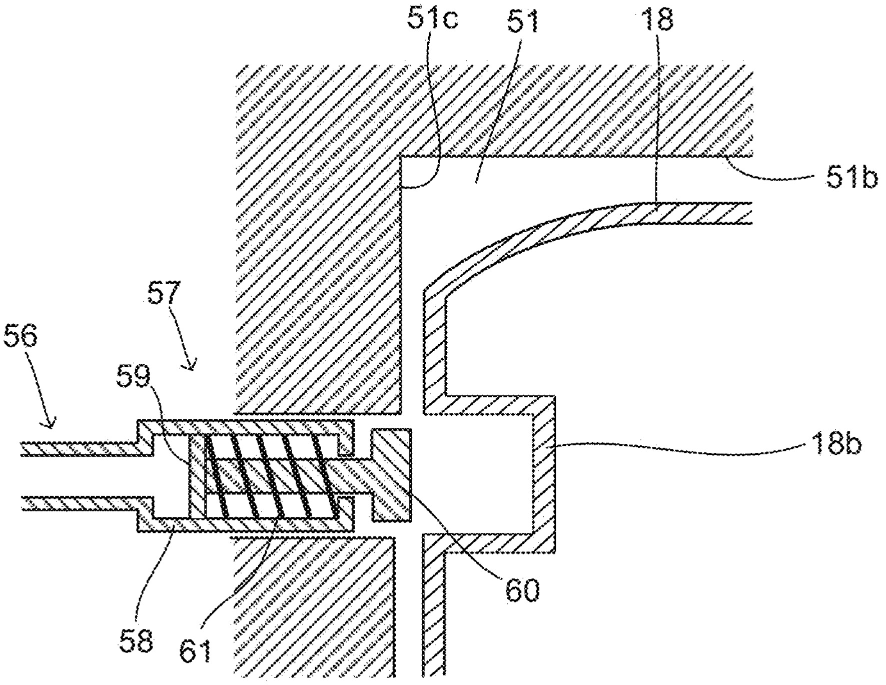
FIG. 5B is a diagram illustrating the locking mechanism 57 in a state in which the locking mechanism 57 is released.

The locking mechanism 57 is disposed on the bottom 51*c* of the storage portion 51 and switches between prohibition and permission of attachment and detachment from the storage portion 51 of the hydrogen cartridge 10. It shows a configuration of a locking mechanism 57 according to one form in the FIGS. FIGS. 5A and 5B are views of the locking mechanism 57 and its periphery in FIG. 4. FIG. 5A is a locked state by the locking mechanism 57. FIG. 5B represents a state in which the locking mechanism 57 is released, respectively.

Locking mechanism 57 in this form has a cylindrical cylinder 58, on the inner side of the cylinder 58, the piston 59 movable in the axial direction of the cylinder 58 is disposed. The piston 59 is connected to a rod-shaped pin 60, the pin 60 is provided so as to extend along the axial direction of the cylinder 58 to the outside of the cylinder 58. On the other hand, the locking mechanism branch pipe 56 on the opposite side of the direction in which the pin 60 of the cylinder 58 extends is connected. Further, on the inner side of the cylinder 58, the elastic body 61 for biasing the piston 59 to the locking mechanism branch pipe 56 side (such as a spring) is disposed.

According to such a locking mechanism 57, the piston 59 by the pressure of hydrogen flows into the inside of the cylinder 59 from the locking mechanism branch pipe 56 is pressed against the biasing force of the elastic body 61, the pin 60 connected to the piston 59 It moves so as to protrude to the inside of the housing portion 51.

More specifically, the pin 60 at this time enters the locking mechanism-engaging portion 18*b* which is a recess of the hydrogen cartridge 10 disposed in the housing portion 51. Thus, as long as the pressure due to hydrogen is applied, the hydrogen cartridge 10 cannot be detached from the storage portion 51 (it cannot be rotated about the axis O in this form).

On the other hand, the pressure due to hydrogen is unloaded from the locking mechanism branch pipe 56 (i.e. a condition in which the pressure is also discharged hydrogen in the main pipe 53 is reduced), the pin 60 connected to the piston 59 by the biasing force of the elastic body 61 moves toward the outside of the housing portion 51. More specifically, the pin 60 at this time is detached from the locking mechanism-engaging portion 18*b* which is a recess of the hydrogen cartridge 10 disposed in the housing portion 51. Thus, the hydrogen cartridge 10 can be detached from the storage portion 51 only when the pressure due to hydrogen is unloaded (the hydrogen cartridge 10 can be rotated around the axis O in this form).

Figure 6:
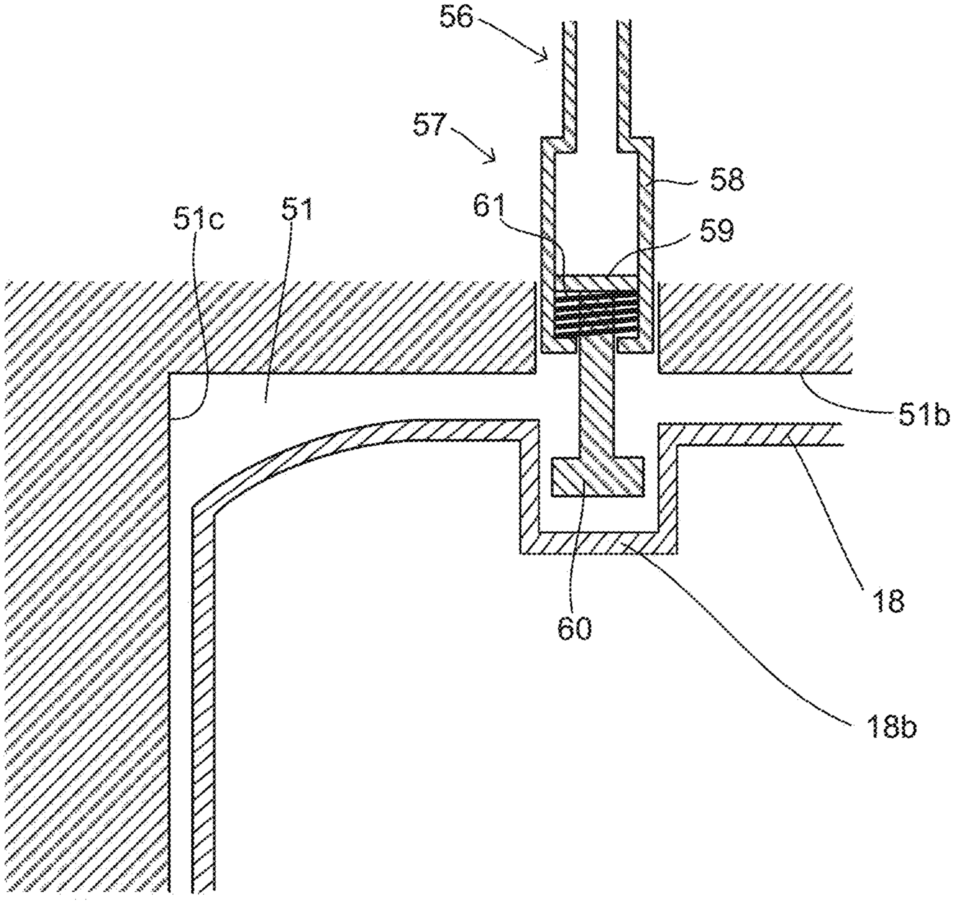
FIG. 6 is a diagram illustrating the arrangement of the locking mechanism 57 of another embodiment.

In the above form, since the hydrogen cartridge 10 is detached from the storage portion 51 by rotating the hydrogen cartridge 10 about the axis O, the locking mechanism 57 and the locking mechanism engaging portion 18 are arranged at a position where the rotation can be restricted. On the other hand, for example, when the form only needs to be moved in the direction of the axial line O in order to detach the hydrogen cartridges 10 from the storage portion 51, for example, as shown in FIG. 6 provided on the inner wall 51*b* of the locking mechanism 57 of the storage portion 51, it may be provided with a locking mechanism engaging portion 18*b* at a position opposite to this.

2.6. Valve, Hydrogen Discharge Part

The valve 70 is a switching valve, and hydrogen can be discharged from the hydrogen discharge unit 71 to the outside by opening the valve 70. On the other hand, when the valve 70 is closed, the discharge of hydrogen from the hydrogen discharge unit 71 to the outside is regulated. Thus it is possible to depressurize the internal pressure of the main pipe 53 and the lock mechanism branch pipe 56 by discharging hydrogen remaining in the main pipe 53 or the like by opening the valve 70 during detachment to the housing portion 51 of the hydrogen cartridge 10 as described later from the hydrogen discharge portion 71.

Valve 70 may be a valve that can be opened and closed manually, or may be a valve that opens and closes by an electrical signal.

3. Action, etc

The hydrogen filling apparatus 50 described above, for example, to fill the hydrogen cartridge 10 as follows.

In a closed state, the valve 70 inserts the hydrogen cartridge 10 to be filled with hydrogen into the storage portion 51 of the hydrogen filling device 50 and attaches it. At this time, the on-off valve 16 of the hydrogen cartridge 10 as described above is connected to the connecting device 55 of the hydrogen filling apparatus 50 is opened the on-off valve 16 is opened the tank 11 of the hydrogen supply branch pipe 54 and the hydrogen cartridge 10 is in communication state. In addition, in this form, when the hydrogen cartridge 10 is rotated about the axial line O, the connecting portion 16*a* of the hydrogen cartridge 10 and the connected portion 55*b* provided in the connecting device 55 of the hydrogen filler 50 is engaged.

In a condition in which the hydrogen cartridge 10 is mounted in the storage portion 51 of the hydrogen filling device 50 in this manner, the nozzle of the outer hydrogen supply device is connected to the hydrogen supply portion 52 of the hydrogen filling device 50. Thus hydrogen flows into the main pipe 53, further hydrogen flows into the hydrogen supply branch pipe 54, the locking mechanism branch pipe 56, the pressure in each pipe also increases.

Hydrogen flowing into the hydrogen supply branch pipe 54 enters the tank 11 and is filled into the hydrogen cartridge 10.

Hydrogen flowing into the locking mechanism branch pipe 56 enters the cylinder 58 of the locking mechanism 57, it is engaged with the locking mechanism engaging portion 18*b* by projecting the pin 60 as described above with reference to FIG. 5A to be locked. That is, in this form, the hydrogen cartridge 10 in an attempt to turn around the axis O so as to separate the hydrogen cartridge 10 from the storage portion 51 in this condition can not be the rotation by the pin 60, it is not possible to make the separation.

When filling is completed, the valve 70 is opened to discharge hydrogen from the hydrogen discharge unit 71. Thus, the main pipe 53, the hydrogen supply branch pipe 54, the hydrogen in the locking mechanism branch pipe 56 is discharged, the internal pressure in the pipe is lowered.

Since a check valve is disposed in the hydrogen supply branch pipe 54 as described above, hydrogen filled in the hydrogen cartridge 10 is maintained without backflow.

Hydrogen in the cylinder 58 of the locking mechanism 57 is discharged, the pin 60 as described above with reference to FIG. 5B is disengaged from the locking mechanism engaging portion 18*b*, the unlocked status. Thus, the hydrogen cartridge 10 can be rotated about the axis O in an attempt to detach from the storage portion 51, and the hydrogen cartridge 10 can be detached from the storage portion 51.

As described above, according to the hydrogen filling device 50, when hydrogen is filled in the hydrogen cartridge 10, detachment of the hydrogen filling device 50 and the hydrogen cartridge tank 10 is prohibited by the locking mechanism 57. Since this prohibited state is maintained during the hydrogen filling, the hydrogen cartridge 10 does not come off during the hydrogen filling (does not come off even if it is intentionally to be removed), and the release of hydrogen gas due to unintentional desorption can be prevented.

Further, by a mechanical structure so that the pin 60 of the locking mechanism 57 is pushed toward the hydrogen cartridge 10 side by the pressure of hydrogen in the pipe, it can be a lock mechanism that operates reliably with a simple structure.

In the above embodiment, the locking mechanism 57, the cylinder 58 to each of the housing portion 51, the piston 59, the pin 60, and has a configuration in which an elastic body 61, not limited to this, the pin 60 is required to be disposed in each housing portion 51, the member other than the pin 60, to operate a plurality of pins 60 at the same time it may be configured to include one for a plurality of pins 60.

REFERENCE SIGNS LIST

10 . . . Hydrogen cartridge, 11 . . . tank, 12 . . . liner, 13 . . . reinforcing layer, 14 . . . protective layer, 15 . . . base, 16 . . . opening/closing valve, 17 . . . case, 18 . . . housing, 50 . . . hydrogen filling device, 51 . . . storage part, 52 . . . hydrogen supply part, 53 . . . main pipe, 54 . . . hydrogen supply branch pipe, 55 . . . connection device, 56 . . . branch pipe for lock mechanism, 57 . . . lock mechanism, 70 . . . valve, 71 . . . hydrogen discharge part

What is claimed is:

1. An apparatus configured to fill attachable and removable hydrogen cartridges with hydrogen, the apparatus comprising:
- a main pipe configured to supply hydrogen;
- a first connection part configured to releasably connect with a first hydrogen cartridge such that a first connecting portion of the first hydrogen cartridge can engage and disengage the first connection part, the first connection part connected to the main pipe to fill the first hydrogen cartridge with hydrogen from the main pipe;
- a first locking mechanism that restricts removal of the first hydrogen cartridge from the apparatus;
- a second connection part configured to releasably connect with a second hydrogen cartridge such that a second connecting portion of the second hydrogen cartridge can engage and disengage the second connection part, the second connection part connected to the main pipe to fill the second hydrogen cartridge with hydrogen from the main pipe;
- a second locking mechanism that restricts removal of the second hydrogen cartridge from the apparatus, wherein
- at a time of filling the first hydrogen cartridge with the hydrogen from the main pipe, the first locking mechanism is connected to the first hydrogen cartridge by use of pressure of the hydrogen from the main pipe so that the first hydrogen cartridge is locked, and at a time of filling the second hydrogen cartridge with the hydrogen from the main pipe, the second locking mechanism is connected to the second hydrogen cartridge by use of pressure of the hydrogen from the main pipe so that the second hydrogen cartridge is locked.

2. The apparatus according to claim 1, wherein
- the first locking mechanism comprises a cylinder and a pin, and
- the pin is pressed and moved by the pressure of the hydrogen from the main pipe into engagement with the first hydrogen cartridge so that the first hydrogen cartridge is locked.

3. The apparatus according to claim 1, wherein the first locking mechanism and the second locking mechanism each comprise:
- a cylinder;
- a piston movable in an axial direction of the cylinder;
- a pin connected to the piston;
- an elastic body that biases the piston and the pin in a first direction; and
- wherein the pressure of the hydrogen from the main pipe on the piston biases the piston and the pin in a second direction opposite the first direction.

4. The apparatus according to claim 1, further comprising a discharge valve connected to the main pipe, wherein opening the discharge valve releases the pressure of the hydrogen from the main pipe and unlocks the first locking mechanism and the second locking mechanism.

5. The apparatus of claim 1, further comprising a housing portion having a first inner wall and a first opening to receive the first hydrogen cartridge, and having a second inner wall and a second opening to receive the second hydrogen cartridge.

6. The apparatus of claim 1, wherein the first hydrogen cartridge comprises:
- a first housing having a first opening and a first recess, the first locking mechanism engages with the first recess when the first locking mechanism is locked; and
- a first tank configured to store hydrogen, the first tank disposed in the first housing and having a first mouthpiece accessible through the first opening of the first housing, and wherein the second hydrogen cartridge comprises:
- a second housing having a second opening and a second recess, the second locking mechanism engages with the second recess when the second locking mechanism is locked; and
- a second tank configured to store hydrogen, the second tank disposed in the second housing and having a second mouthpiece accessible through the second opening of the second housing.

* * * * *